March 3, 1931.  P. P. HORNI  1,794,690
AIRCRAFT CONTROL
Filed June 8, 1929   5 Sheets-Sheet 1

INVENTOR
Paul P. Horni
BY
Knight Bro
ATTORNEYS

March 3, 1931.   P. P. HORNI   1,794,690
AIRCRAFT CONTROL
Filed June 8, 1929   5 Sheets-Sheet 4

Fig. 4.

Inventor
PAUL P. HORNI
By his Attorneys
Knight Bro

Patented Mar. 3, 1931

1,794,690

UNITED STATES PATENT OFFICE

PAUL P. HORNI, OF NEWARK, NEW JERSEY

AIRCRAFT CONTROL

Application filed June 8, 1929. Serial No. 369,326.

The general object of the present invention is to correlate the manual controls of an aircraft with automatic connections between the controls and certain instruments sensitive to the varying conditions that such controls are adapted to meet, for the purpose of providing a check upon, or a substitute for, the manual operation either in respect to part only of the controls or even to complete automatic functioning thereof.

In the flying of aircraft, particularly heavier-than-air machines, there are so many variables to be watched and met, so many instruments to be kept under constant observation, that it becomes desirable to find means for relieving the pilot of more or less of the required vigilance and in some cases to automatically relieve him in case of fog, low visibility, or temporary disability of the operator. In some cases automatic control will act more promptly and more reliably than manual control and in such event, the manual control can be performed with greater efficiency if such certain other controls are automatically taken care of. For example, some condition may change so slightly, as to be unobservable to the pilot, or his attention may be concentrated on some other condition, or again his personal equation may prevent him responding with sufficient promptness, in which cases, automatic control would be preferable.

Again there are times when the pilot may wish to relinquish all the controls to automatic guidance for the purpose of resting or for observation, photographing, etc., in which case it would be only necessary to set the automatic devices to operate their controls to meet the varying conditions in a predetermined manner. It is well-known that instruments may be adjusted to a degree of sensitiveness and accuracy that would be unapproachable by human beings. The invention comprises independent and interdependent means connecting the various aircraft controls with operative mechanism that is in turn under the control of instruments responsive to the changes in the variables that the aircraft controls are intended to meet.

Thus the control for up and down movements—the elevators—while having the usual hand lever for that operation, are also subject—at the will of the operator—to the influence of mechanism, e. g. an electro-motive device that is capable of holding the elevator steady or of moving it up or down by reason of the fact that the circuit of the motor is controlled by circuit closing devices brought into action by an altimeter set for example to keep the craft at a predetermined altitude. Such altitude control may be also under the influence of a thermostatic device that can be set for example to lower the altitude of the craft when the temperature falls below a given point.

Other instruments such as a ground proximity indicator or ground echo instruments acting singly or in combination, may operate to influence the control of the altimeter, or directly the vertical elevators to cause the plane to rise or fall according to any prearranged plan.

Thus also the right and left or turning controls that move the rudder may have in addition to the hand control lever, additional or auxiliary controlling devices that in turn are responsive to changes in conditions that the said controls are intended to correct. Such auxiliary controls will be connected for example to devices affected by a compass, as for example, an earth inductor compass, or a gyratory compass that will, when the craft tends to vary from its predetermined course, close circuits that will operate electric motive means to turn the rudder and bring the craft back to the proper direction.

So too a drift indicator or meter that is designed to measure the side drift due to the wind may also be used to affect the rudder to just the right amount to hold it to its proper course. Such a drift indicator would take no account of winds in the line of flight.

An instrument for measuring speed with respect to earth, irrespective of motor speed or wind, may measure off the miles traveled. With an accurate register of the distance traveled, it becomes possible to predetermine many things that it is desired to accomplish.

For example, an aircraft may be caused to proceed to a certain distant point, there drop a parcel or give a signal, then return to its starting point and then land.

The invention further relates to a correlation of the elevator control mechanism with mechanism connected with and controlled by an instrument sensitive to the proximity of the ground as for example a sound ranging— an electrical capacity altimeter, or a radio echo altimeter, for the purpose of effecting a landing at the proper time and place and at the proper ground angle, or for the purpose of raising the plane in case the ground beneath the plane is becoming too near for safety.

The invention further contemplates so controlling the movements of an aircraft by automatic instruments as to cause it to respond to the pressure of the wheels upon the ground to cause the elevators to change the angle of attack when the conditions of speed and load have reached a point where the craft is capable of rising from the ground so that false attempts may not be made. It is also contemplated that devices sensitive to light, e. g. a selenium cell, may be brought into action to cause a plane to automatically start up and go off on a predetermined flight when a certain amount of light is present or absent.

Other combinations than those cited will be disclosed in connection with a description of an embodiment of the invention as illustrated in the accompanying drawings, in which.

Figure 1:
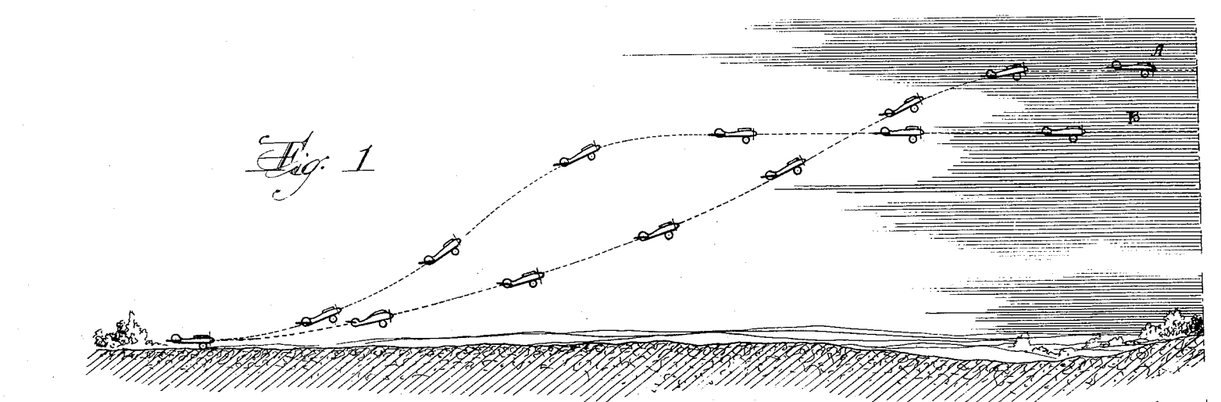
Figures 1 and 1a are diagrammatic views showing in elevation the flight of two airplanes.
Figures 1A, 2A:
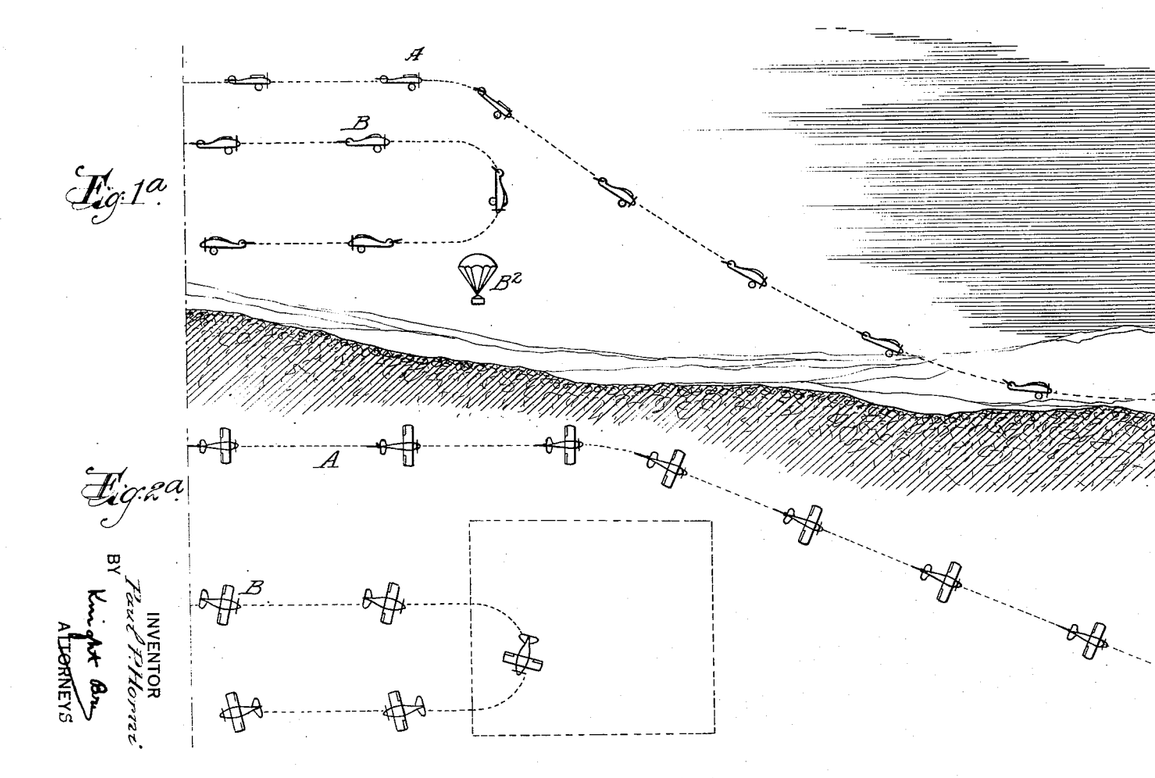
Figures 2 and 2a are similar views in plan.
Figure 2:
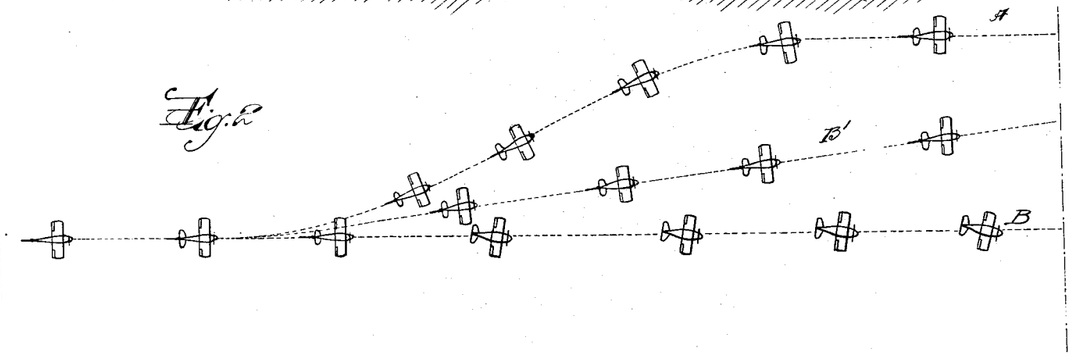

In Figures 1 and 2, there are shown diagrammatic flights such as it is proposed to accomplish automatically or semi-automatically by means of my invention. For example, A represents the flight of an airplane starting from the ground, rising to a given elevation, passing to the left a certain predetermined distance while rising, then proceeding on a certain course at a fixed altitude, and at a predetermined point starting to descend, turning to the right and finally making a landing. At B is shown the diagrammatic flight of an airplane leaving the ground, rising to a certain height, and flying to a definite destination, and then dropping a package and reversing on its course to return to the point from which it started, in which case a landing would be made similar to that shown at A. At B' is shown the course the plane would have taken on account of the wind, correction for which is made by proper instruments so that the plane flies on its true predetermined course B.

Figure 3:
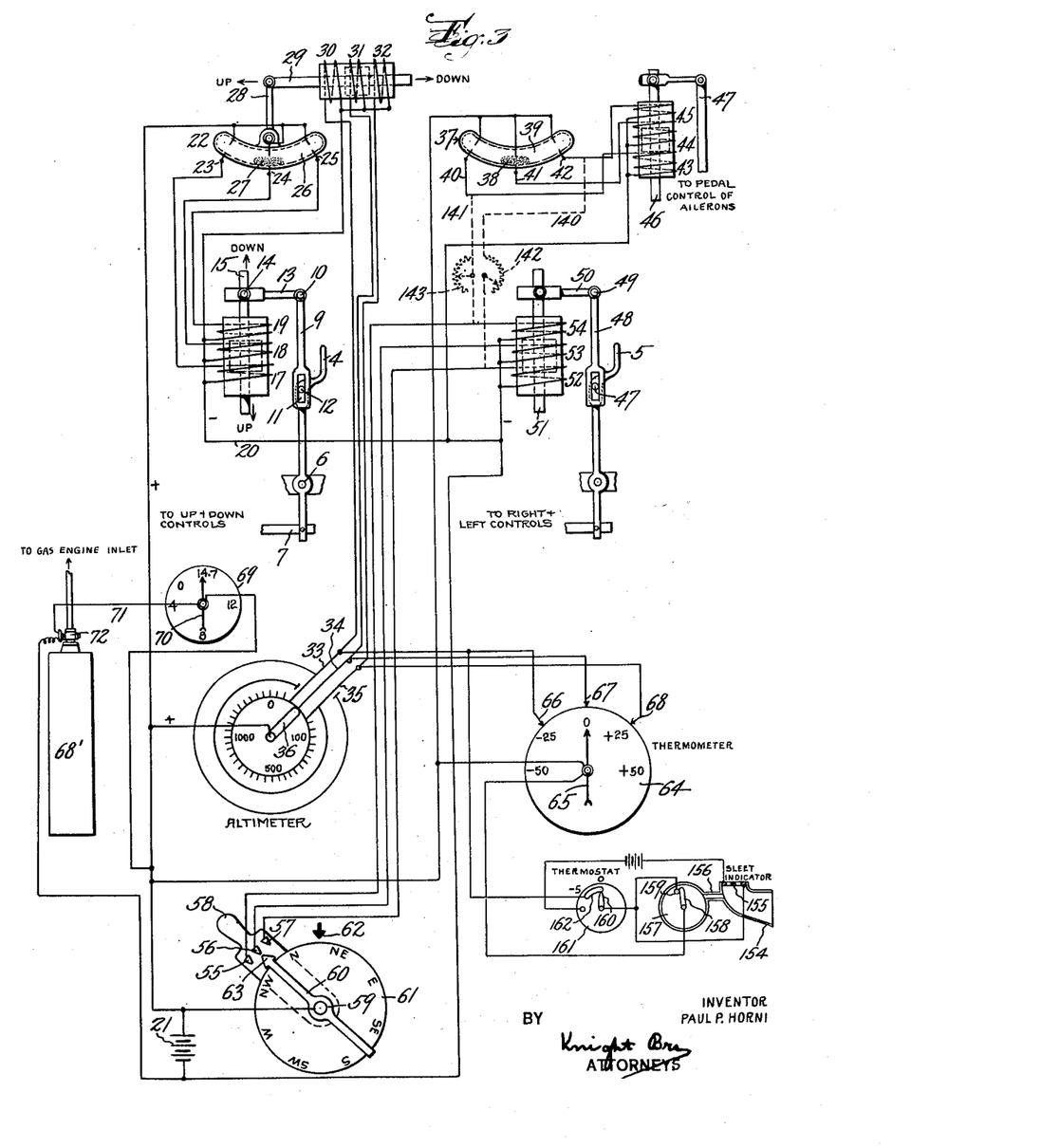
Figure 3 is a diagrammatic view of the various controls and their automatic attachments.
Figure 4:
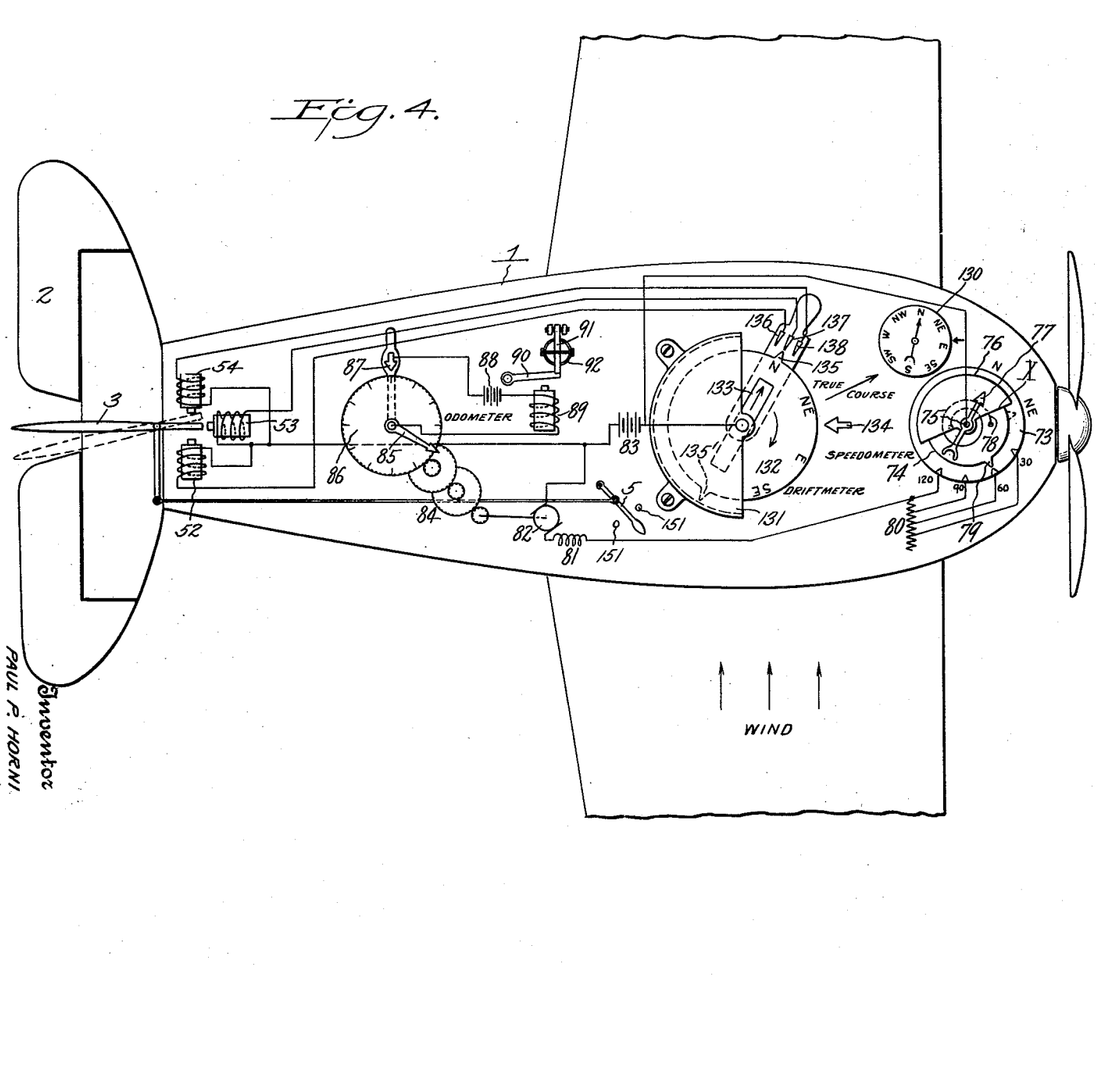
Figure 4 is a diagrammatic view.
Figure 5:
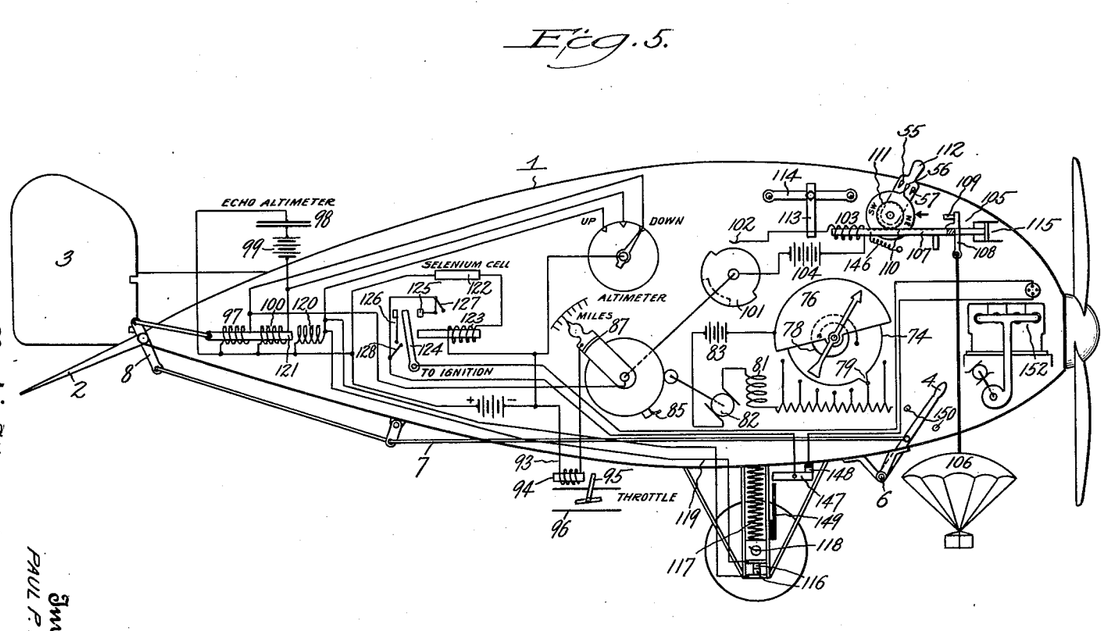
Figure 5 is a similar view in elevation of the fuselage of an airplane with the automatic attachments mounted thereon.

An airplane fuselage is shown at 1 (see Figures 4 and 5). At 2 is shown the elevator and at 3 the rudder. The elevator is operatable by a hand lever 4 and the rudder by a hand lever 5. The lever 4 is shown pivoted at 6 with its lower end connected to a rod 7 that passes rearwardly to the crank arm 8 of the elevator 2. A bell crank 9 (see Figure 3) pivoted at 10, has a slotted end 11 working over a pin 12 on the lever 4, and the other arm 13 of the bell crank is articulated at 14 to an iron core 15 of the solenoid comprised of three coils 17, 18, and 19. These coils have one of their terminals connected to the wire 20 which leads to the negative terminal of battery 21. These solenoid coils have their other terminals connected to a level stabilizer 22 which is provided with three pairs of contacts 23, 24, 25, piercing the walls of a crescent-shaped glass tube 26. In the tube is a globule of mercury 27 which is adapted to close the gap between any one of the terminals, according to the angle of pitch of the stabilizer. Normally when flying on a horizontal course, the mercury will make contact with the center terminals 24 only, and this will connect the middle coil 18 of the solenoid in circuit with the battery, the result of which is to hold the control lever 4 in its neutral position with the elevators at the right position to keep the plane on a horizontal course. The stabilizer 22 has an arm 28 connected to the core 29 of the three-coil solenoid 30, 31, 32. One terminal of each of these coils is connected to the negative wire of the battery, while the other terminals are connected to wires 33, 34, 35, that have terminals capable of contacting with the arm 36 of an altimeter, the current making contact from the positive pull of the battery through said arm to any one of the wires 33, 34, or 35, according to whether the plane is below the predetermined altitude, determined by the position of arm 36, or at the right altitude, or above the said altitude. If for example, the plane is depressed below the predetermined altitude, wire 33 becomes energized and causes the stabilizer to rock so as to bring the mercury contact 27 into contact with the terminals which will result in an elevation of the core 15 which will cause the elevator 2 to be lifted until the plane has reached the proper altitude, when the arm 36 will leave the wire 33 and contact with the wire 34. This will operate to bring the stabilizer back to normal position as shown in the figure. The arm 36 of the altimeter, it will be understood, will be a movable member of any practical altimeter that indicates altitudes above sea level, or it may be the movable member of an electrical capacity altimeter or a sound ranging altimeter, or an electric radio echo altimeter, any of which will indicate and hold the plane at a given distance above the nearest ground. A device similar to stabilizer 22 is shown at 37 which also has a mercury globule 38 in a crescent tube 39 with three pairs of contacts 40, 41, and 42 controlling three coils 43, 44, and 45, that have under their influence an iron core 46 that operates a crank 47 that controls the pedals that are ordinarily used for removing of the ailerons. The device 22 is placed fore and aft while the device 37 is placed transversely of the airplane, and it will be readily understood that its function will be to keep the airplane on a level keel. Any tipping of the plane will bring either 40 or 42 into the path of the mercury globule and the excitation of the corresponding coils 43 or 45 will move the ailerons to restore the plane to the level. Similarly the lever 5 that controls the rudder has a pin 47 that operates in the slot of an arm 48 of a bell crank pivoted at 49, the other arm 50 being articulated to an iron core 51 that is under the influence of three solenoid coils 52, 53, and 54, the free terminals of said coils leading to contacts 55, 56, and 57 of an adjustable arm 58. This arm is movable around the center 59 which is also the center of a compass which has a member 60 tending to lie in the meridian. The compass has the usual lubber ring 61 and lubber line 62, and it may be either a magnetic, gyroscopic, or earth inductor type. The movable member has a contacting point 63 adapted to make contacts with either one of the three terminals 55, 56, 57. Normally, when the craft is pursuing its proper course, the movable member will contact with the center contact 56 which will energize the coil 53 and this will result in the rudder control holding the rudder directly fore and aft. Should the movable member 60 move to one side owing to a swerving of the craft from its true course, contact will be made with one of the side contacts 55 or 57 energizing coil 52 or 54, which will result in turning the rudder to bring the craft back upon its course.

As a further control of the up and down movements, I may make use of a thermometer 64, the movable member 65 of which, by making contacts with wires 66, 67, and 68, may impose electromotive forces on coils 30, 31, 32 to cause the plane to descend in case the temperature decreases below a certain predetermined amount, and ascend when the temperature rises to a certain predetermined amount. At 68' is shown a reservoir of oxygen that may be used as an auxiliary supply to the engine, which supply will be controlled by a pressure gage or aneroid barometer 69, the movable member 70 of which will make contact through the circuit 71, when a predetermined altitude is reached, to open an electromagnetic valve 72 and allow the oxygen to flow to the inlet of the airplane engine. This is intended to be merely a diagrammatic representation of the required elements. Instead of a reservoir, an ordinary super-charger may be thus automatically brought into play when the pressure of the atmosphere falls below a certain predetermined point.

Referring now to Figure 4, there is shown at 73 in diagram a speedometer which comprises a metallic disc 74 preferably of aluminum which is pivoted at 75 in a case 76 that is made of iron and covers half of the disc both above and below. The casing 76 is set with the diameter dividing its closed from its open side pointing to the true course, which will be a certain angle X from the meridian line, as shown by the arrow 77, which should be the movable member of a powerful compass. When so set, the drag of the vertical components of the earth's magnetic lines of force traversed by the aluminum disc 74, will be proportional to the speed of the engine along its true course, although the machine itself may not be pointed that way. A delicate spring 78 tends to withstand this drag. When the airplane is stationary, a contact 79 on the aluminum disc will be in the position shown by the dotted line. As the speed of the airplane increases, it will contact successively at 30, 60, 90 and 120, which are connected to different points of a resistor 80 in the circuit of an electric motor having a field magnet 81 and an armature 82, the other terminal of the motor being connected through battery 83 to the pivotal point 75 of the aluminum disc. The points 30, 60, 90, and 120, will be indicators of the speed the machine is making with reference to the ground and will be independent of any other forces bearing on the plane. The motor 81, 82, will be adjusted to run at a speed corresponding to speed of the plane with respect to the ground, and through clock mechanism 84 may turn a hand 85 to measure off the miles on a dial 86. At 87 (see Figure 4) is shown an adjustable contact movable around the dial 86 with which movable member 85 may make an electrical connection through battery 88 and magnet 89 when a predetermined number of miles have been traversed. The functioning of magnet 89 will move its armature 90 to release a trigger 91 upon which is suspended an article 92 that it is desired to drop at a predetermined point.

In Figure 5 is shown diagrammatically a similar mileage indicator, which, when its contact 87 is reached by the movable contact 85, closes a circuit 93 through a magnet 94 that acts to close or partially close a throttle 95 in the engine intake pipe 96. The same circuit extends to a motive power device which is shown as a solenoid 97, the function of which is to depress the elevator 2 simultaneously with the closure of the throttle 95 so that the aircraft will commence to descend after a certain number of miles have been traversed. At 98 is shown an echo altimeter which may be a device of the Alexanderson type in which electromagnetic vibrations cause a source of electric power 99 to function and give an electric impulse at a predetermined distance from the ground. This electric pulsation will be conveyed to a solenoid 100 or other electro-motive device that will tend to move the elevator 2 into a horizontal position, notwithstanding what other forces are being applied to the elevator, so that when the craft approaches within a given distance of the ground, it will straighten out into the desired horizontal course, and owing to the slow speed of the motor from the closure of the throttle, will gradually settle gently to the ground. Turnable with the movable member 85 which measures off the miles traversed with respect to the ground, is a rotating contact member 101 which may be used for a variety of purposes. As shown, it has a contacting finger 102 connected through a solenoid coil 103 with a source of electrical energy 104. The solenoid has releasing mechanism shown at 105 whereby a package or parachute shown at 106 may be released after a predetermined mileage has been traversed, the core 107 of the solenoid engaging under a hook 108 resting against the stop 109 acting as a releasing latch for the package. The core 107 has a rack at 110 engaging with a gear 111 on a contact arm 112 carrying contacts 55, 56, 57, such as shown in the lower part of Figure 3. When the solenoid core 110 is drawn into the solenoid, the rack and gear revolve the arm 112 around through a predetermined distance as measured by the stop 113 adjustable on a support 114. At a certain distance, for example, the rotation of the arm 112 may be made to pass through 180° in which case the craft will be turned around on a horizontal plane and will then retrace its course. It will be understood that the rotation of the arm 112 in this manner is the equivalent of changing the setting of the lubber ring with respect to the lubber line, and in order that this change in course may not take place too suddenly, I provide a retarding device which may, for example, be in the form of a dashpot as shown at 115, the piston of which is connected to the solenoid core 110. As it is desirable also to automatically determine the exact point at which the elevator 2 shall be lifted to cause the craft to rise from the ground, I provide in the circuit of the elevating solenoid, a pair of contacts shown at 116, which, when the craft has attained sufficient velocity with reference to the air to overcome gravity, will be forced in contact by a spring 117 that supports the fuselage on the shaft bearing 118. A circuit will then be completed through wires 119 to a solenoid coil 120 that will act on the core 121 that is articulated to the elevator to cause the elevator to rise. The coil 120 is also under the influence of the altimeter as well as the coils 97 and 100 in the same manner as was described in reference to Figure 3. When on the ground, the altimeter will naturally be contacting on the upgoing circuit, but such upgoing circuit is not completed until contact is made at 116. When contact is made at 116 and the upgoing circuit is completed, the altimeter then throws the elevator 2 into a position to elevate the craft. The altimeter will then continue to cause the craft to move upwardly until a predetermined altitude is reached as described in connection with Figure 3. As a further means of automatically starting the craft, for example, if it should be desired to have the craft start of itself when a certain degree of daylight occurs or ceases, I have shown a selenium cell 122 which, having a resistance sensitive to light, will upon a given change of resistance cause the solenoid 123 to act on armature 124 to close either a forward or a back contact 125, 126 to start the ignition of the engine, the engine being presumably primed beforehand, although the ignition circuit may also do the priming. It will be understood that since selenium has its resistance decreased with light, an increase of light will cause the coil 123 to contract its armature and close the circuit on 125, which, if the switch 127 is closed on said contact, will result in the ignition circuit being closed on the accession of light, as for example, by the occurrence of daylight. The back contact, on the other hand, may be brought into play by the closing of switch 128 in which case the ignition will be started when daylight ceases. Instead of daylight, artificial light may be used to bring about these results.

Referring to Figure 4, an ordinary compass is shown at 130. In this figure I have also shown an instrument which is responsive to drift due to side wind, with connecting mechanism whereby the instrument is made to so control the rudder as to turn the craft at just the right angle to the true course to compensate for the wind drift. This instrument comprises an iron casing 131, semicircular in form and in the hollow of which an aluminum disc 132 is half immersed. At 133 is shown mounted on the disc, a magnetic needle or other meridian seeking member. The disc is marked like a lubber ring and turns adjacent to the ordinary lubber line 134. At 135 a contacting point on the disc is arranged so as to make light contact or close approach to contact sufficient for a high tension current to jump the space, with contacts 136, 137, and 138, which lead respectively to coils 52, 53, and 54 which have the same function as the similar coils shown in Figure 3. The disc 132 is traversed by the vertical components of the earth's magnetic lines of force, except where it is shielded by the casing 131. If then a wind blows from the right as shown by the arrows, the vessel moving to the left will cause the exposed part of the disc to engender eddy currents owing to its cutting of the said lines of force. The work which it has to do, therefore, causes the disc to turn to the right. This will cause the contact 135 to move to the right and contact with point 138 which, energizing coil 54, will throw the rudder into the dotted position and turn the vessel to the right. The force opposing the drag is naturally the element 133 which tends to stay in the meridian. It will however be dragged out of the meridian a distance proportional to the side velocity of the wind or the side component of the velocity of the wind, and will continue so to be held out of its natural position even though the turning of the craft brings the contact 135 back into circuit making position with contact 137, which action straightens out the rudder. A second contact shown in dotted lines at 135' will function the same as 135 when the craft is swung 180°.

Referring to Figure 3, circuits 140 and 141 shown in dotted lines, together with the adjusting rheostats 142 and 143 therein, may be used to cause a sympathetic movement between the rudder controls and the aileron controls, the rheostats 142 and 143 being used to determine any desired degree of cooperation of these two controlling elements.

As it is desirable to have the engine stop when the craft reaches the ground, I have shown in Figure 5, in connection with the landing gear, a pivoted contact member 147 which is included in the ignition circuit of the engine and normally makes contact with a stationary contact member 148. A spring tripper 149 will, by impinging against the end of member 147 tip it away from member 148 and break the ignition circuit when the weight of the craft compresses the spring 117 to a proper degree. Before starting again, the spring member 149 is set behind the member 147 and in its downward movement will not act to open the ignition circuit. It will be understood that in automatic operation of the rudder and elevator, there will be a limit beyond which it will not be safe to have them move. Stops 150 are shown for predetermining the angular motion of the elevator by limiting the throw of the manual control lever, and stops 151 predetermine the limit for the lever controlling the rudder. The engine for driving the craft is indicated at 152.

While I have shown automatic means for controlling the manipulation of the various controls, it is understood that these may only be used as aids to or in partial substitution for the manual controls. Thus in Figure 5, the elevator is also under control of the lever 4, and in Figure 4 the lever is also under the control of the hand lever 5.

It is also desirable to provide means for changing the altitude of the craft when sleet conditions prevail. As sleet is only liable to occur at temperatures at or immediately below the freezing point, and at moderate altitudes, I have provided means for causing the craft to ascend to a higher altitude when sleet occurs.

At 154, see Figure 3, is shown a venturi that has at its restricted portion a perforated septum 155, the apertures of which are designed to be closed or partially closed by sleet caught by the venturi. A pipe 156 communicating with a sensitive pressure gage 157 enables a movable contact finger 158 to make connection with contact 159, which in turn leads to a finger 160 of a special thermometer 161 that is provided with a contact 162 covering a temperature range for example of 0° to 5° centigrade, or any other range that practice shows to be desirable. The contact 162 is connected to the circuit controlling the solenoid 30 that tends to make the craft ascend. Should sleet occur, the stoppage of the orifices in the septum 155 will tend to drive the air with greater force through the tube 156 resulting in the closure of contacts 158, 159. As the temperature must be in the vicinity of freezing, the contacts 160, 162 will be closed and so the current will flow through the solenoid 30 and cause the craft to rise. Such ascension to higher altitudes will be opposed by the altimeter, but this restraint will be overcome to the desired extent by adjustment of the sleet controlled forces. Should the ascent bring the craft into colder atmosphere where sleet formation no longer takes place, the thermometer contact 160 will break connection with the contact 162 and it may then make contact with a terminal 163 that leads through an electric source 164 to the septum 155 which would be of the nature of an electric heater element so as to melt the ice on the septum and thus restore the altimeter to full control. Should the craft then again descend within the sleet area, the process would be repeated with the result that the craft would never accumulate but a thin coating of ice.

It will be seen from the foregoing description that the flight of an airplane may be controlled to make a variety of excursions, two of which are shown in Figures 1 and 2, and 1a and 2a. Thus the airplane indicated by A would first veer to the left at a certain angle, which angle would be determined by the stop 113. After a period of time, in this case coincident with its reaching a predetermined altitude under the action of the disc 101, the solenoid 103 would return to its original position under the influence of proper retractive means, such for example as the spring 146, and then again, after a given number of miles, will, in this case corresponding with the commencing of its descent, change again its angle and return to its original line of flight. This would be accomplished by a notch in the wheel 101, as shown by the dotted line. At B another flight is shown, where a side wind would tend to make the plane take the course shown at B', but the automatic instrument 131, 132 acting on the rudder would cause the plane to change its yaw to make sufficient compensation for the side drift of the wind to keep the plane on its true course. After a given distance traveled, the plane can be made to turn upon itself and return to the point of starting. At the point of turning it may be made to drop a parachute, bomb, or package of any kind as shown at B2.

While I have shown most of the apparatus in diagrammatic form for the sake of clarity, it will be understood that more practicable devices would be in practice used. I do not make claim herein for any of the instruments per se as they are all well known in the art, but what I do claim is:—

1. In an aircraft, the combination comprising a rudder, reversible motive means connected to the rudder to turn the same, means responsive to the traverse of the earth's magnetic field for measuring the mileage traversed over the ground, a compass having a pivoted contact member tending to lie in the meridian, and a contact member turnable around the center of said pivoted member, the said contacts being connected with the circuits of the motor to make the rudder responsive to motions of the pivoted member to keep the craft on a predetermined course and adjustable means operated by the mileage measuring means for causing the said turnable contact to change the course of the craft to a predetermined different course.

2. A combination according to claim 1 with means for retarding the turning movement.

3. In an aircraft, the combination comprising a rudder, reversible motive means connected to the rudder to turn the same, means for measuring the mileage traversed over the ground, a compass having a pivoted contact member tending to lie in the meridian, and a contact member turnable around the center of said pivoted member, the said contacts being connected with the circuits of the motor to make the rudder responsive to motions of the pivoted member to keep the craft on a predtermined course, means operated by the mileage measuring means for releasing an article at a predetermined point and means connected with said releasing means for altering the course when said releasing means operates.

4. In an aircraft, the combination comprising a driving engine having an electric ignition circuit, a selenium cell, a source of electricity connected in circuit therewith, a translation device in the circuit operatable upon a predetermined change of luminosity to close the ignition circuit.

5. In an aircraft, the combination comprising, an elevator for changing the pitch, an altimeter, means responsive to changes in said altimeter connected to the elevator to change the pitch to keep the craft at a predetermined altitude, a measuring device responsive to the distance that the plane moves through the earth's magnetic lines of force, and connections from said measuring device to the elevator to alter the pitch from that called for by the altimeter after a predetermined distance has been traversed.

6. In an aircraft, the combination comprising a rudder, manual control therefor, a compass having a pivoted member tending to lie with a given axis in the meridian and provided with a contact point, a movable contact member adapted to be adjusted around the center of the said pivoted member to indicate the true course, a reversible motor connected to the rudder, one terminal of the motor connected through a source of electricity to the said contact point on the pivoted member and the other terminal to the contact on the contact member so that the rudder will turn in direction to correct variation from course, ailerons, electromotive means for moving same, and electric connections from said electromotive means to the rudder control circuits to bank the plane in cooperation with the turning.

7. In an aircraft, the combination comprising a rudder for turning the craft around its vertical axis, manual control therefor, a compass having a pivoted member tending to lie in the meridian, and a dial member turnable with reference to the craft adapted to be adjusted around the center of the said pointer member to set the course of the craft, reversible motive power means connected to the rudder, means connected to the said pivoted member to start the motive means in one direction or the other according to which way the said pivoted member moves, ailerons for turning the craft around its longitudinal axis, reversible motive power means connected to the ailerons, a transverse stabilizer having circuit connections to said aileron motive means, and circuits cooperatively connecting the two motive power means with means in said connecting circuits for varying the degree of cooperation.

8. In an aircraft, the combination comprising means for causing the craft to turn on its horizontal transverse axis, means responsive to the altitutde for controlling such turning movement, means responsive to deposition of ice coupled to the turning control means to cause the same to alter the vertical movement of the craft when ice is deposited.

9. A combination according to claim 8 in which the means responsive to the deposition of ice comprises a perforated septum in an air passage having an open end pointing forward and a pressure gage connected to said air passage.

10. A combination according to claim 8 in which the means responsive to the deposition of ice comprises a perforated septum in an air passage having an open end pointing forward and a pressure gage connected to said air passage, with an electric circuit having electric means for controlling the turning movement, with means responsive to the pressure in the pressure gage to close said circuit upon a predetermined rise in pressure.

11. A combination according to claim 8 in which the means responsive to the deposition of ice comprises a perforated septum in an air passage having an open end pointing forward and a pressure gage connected to said air passage, with an electric circuit having electric means for controlling the turning movement, with means responsive to the pressure in the pressure gage to close said circuit upon a predetermined rise in pressure, with a thermostat included in said circuit adapted to close the circuit at sleeting temperatures and open the circuit at temperatures lower than sleet forming temperatures.

12. A combination according to claim 8 in which the means responsive to the deposition of ice comprises a perforated septum in an air passage having an open end pointing forward and a pressure gage connected to said air passage, with an electric circuit having electric means for controlling the turning movement, with means responsive to the pressure in the pressure gage to close said circuit upon a predetermined rise in pressure, with a thermostat included in said circuit adapted to close the circuit at sleeting temperatures and open the circuit at temperatures lower than sleet forming temperatures, the said septum having electric heating means and a circuit therefor with contacts on the thermostat connected with said heating circuit and adapted to be closed at temperatures below the sleet forming temperatures.

13. In an aircraft, the combination comprising, a mileage indicator, a motor therefor, means for varying the speed of the motor, means responsive in amplitude of movement to the rate the aircraft traverses the vertical component of the earth's magnetic field, and connections from the said responsive means to the motor speed varying means whereby the movement of the indicator will bear an exact ratio to the distance the aircraft travels.

14. A combination according to claim 13, with means controlled by the mileage indicator for changing the pitch of the aircraft to a predetermined landing angle when a predetermined distance has been traversed.

15. A combination according to claim 13, with motive means for the aircraft having means for controlling its speed, and connections from the mileage indicator to the said speed control means for changing the speed of the craft to a predetermined speed when the mileage indicator reaches a predetermined position.

16. A combination according to claim 13, with a propelling engine for the aircraft, an elevator for varying the pitch, means connecting the elevator and the indicator for causing the craft to assume a predetermined landing angle after a certain distance has been traversed, means also connected to the indicator for reducing the speed of the engine, and means sensitive to the earth's proximity connected to the elevator for returning the aircraft to approximately horizontal flight when a predetermined distance from the ground has been reached.

17. In an aircraft, the combination comprising a rudder, reversible motive power means therefor, a compass having a pivoted member tending to lie with a given axis in the meridian and provided with a contact point, a contact member adjustable around the center of the pivoted member and having contacts and circuits connected to the reversible rudder motor to cause the same to turn to right or left or remain in central position according to which one of them contacts with the pivoted member contact, means responsive in amplitude of movement to the rate at which the said means are carried laterally through the vertical component of the earth's magnetic field, said responsive means being connected to the compass, pivoted means to cause the compass to shift its position and through such shift to turn the rudder until the craft is pointed into the wind sufficiently to hold it to its true course.

18. In an aircraft having a fuselage and an elevator, the combination comprising a ground supporting means, a spring between the supporting means and the fuselage, and means for operating the elevator to elevate the elevator when the spring reaches a predetermined amount of extension.

PAUL P. HORNI.